Nov. 6, 1934.    R. J. KEHL    1,979,270
WELDING APPARATUS
Filed Nov. 23, 1931    2 Sheets-Sheet 1
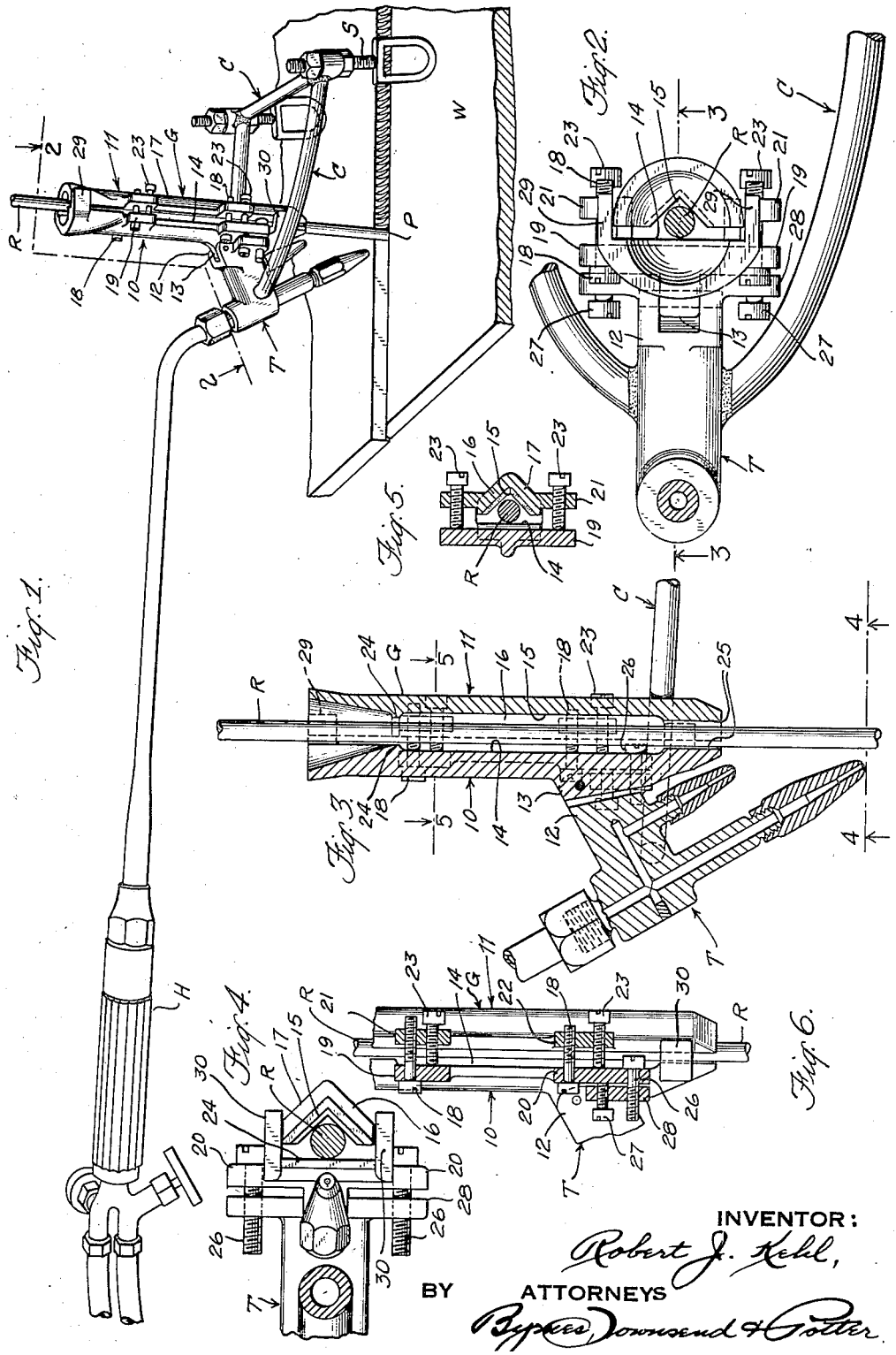
INVENTOR:
Robert J. Kehl,
BY   ATTORNEYS

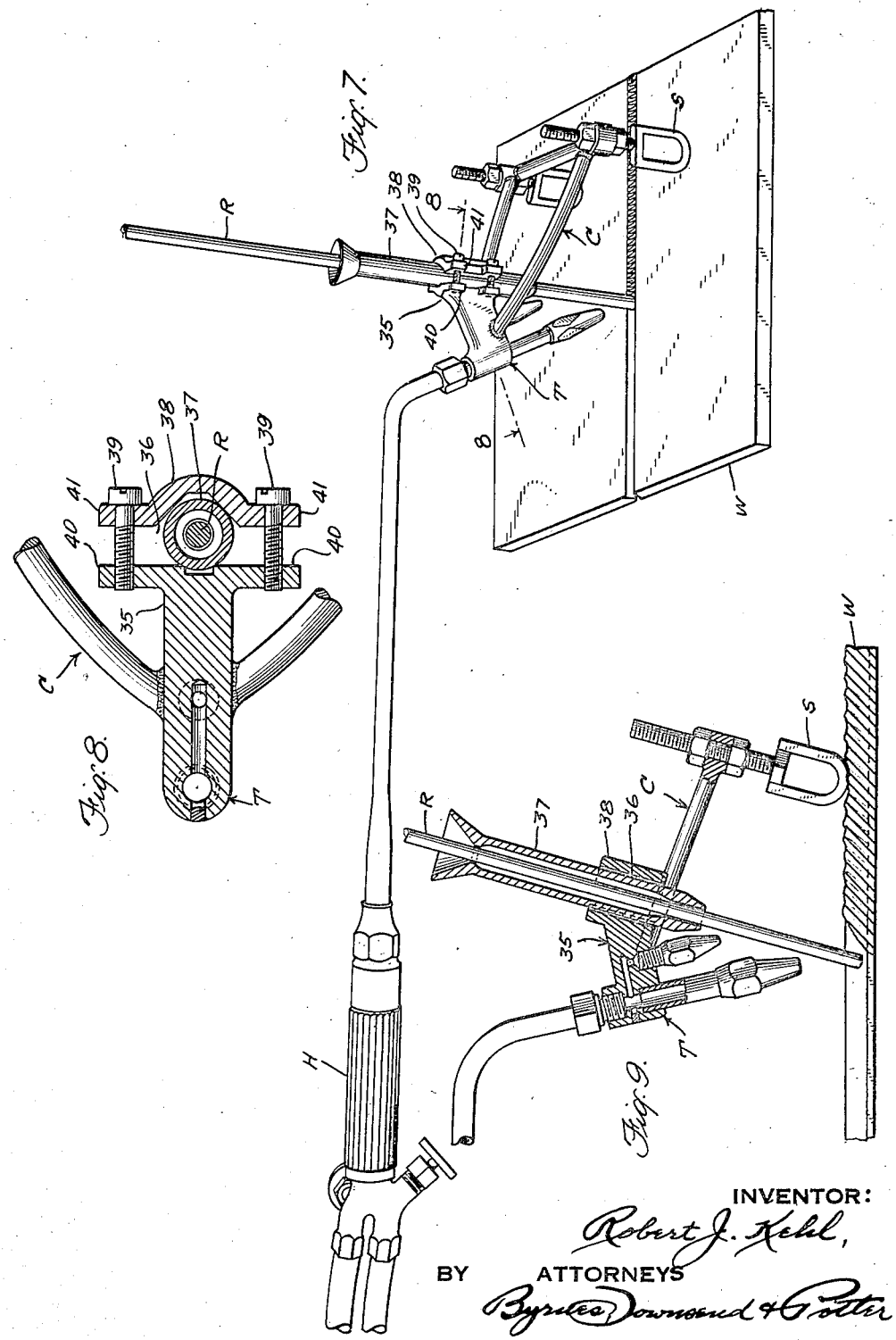

Patented Nov. 6, 1934

1,979,270

UNITED STATES PATENT OFFICE 1,979,270

WELDING APPARATUS

Robert J. Kehl, Bayside, N. Y., assignor to The Linde Air Products Company, a corporation of Ohio Application November 23, 1931, Serial No. 576,892

20 Claims. (Cl. 113—59)

The present invention relates to welding apparatus and particularly to such apparatus adapted for use in hand welding. The invention is an improvement upon the invention disclosed in the copending application of M. J. Wall, Serial No. 552,467, filed July 22, 1931.

Apparatus of this character comprises a heating unit, such as an oxy-acetylene torch, for providing welding heat at the welding point on the work, a rod guide for directing a welding rod to the welding point, and means for manipulating the heating unit relative to the rod being fed and the seam being welded. In welding with such apparatus, it is necessary, at times, for the welder to change from one job to another where conditions are not always the same and where the requirements of heat and of weld metal vary; for instance, it is usually necessary to provide more heat and a greater amount of weld metal in going from a job of welding between thin edges to one of welding between thick edges, in order that the progress of the welding may be substantially the same as that between the thinner edges. The heat requirements may be readily taken care of, in such cases, by selecting appropriately-sized tips and interchanging them on the torch, and the metal requirements by feeding rods of proportionately greater cross section to the welding point. In heretofore known devices, however, no satisfactory means has been provided for feeding rods of various cross-sections by the same apparatus to the welding point and on the contrary such apparatus has ordinarily been adapted to satisfactorily feed rods of one cross-section only.

The primary object of this invention is, therefore, to provide welding apparatus which may be simply and satisfactorily adapted to interchangeably feed welding rods of various cross-section to the welding point and so that the rods so fed will be in the same relation to the heating unit regardless of the cross-section of the rod.

Briefly, the above object is accomplished, in accordance with the present invention, by providing means connected with the heating unit which is adjustable for interchangeably positioning members of various cross-sectional dimensions in definite and fixed relation to the heating unit. Such means may be in the nature of a clamping head having a radially expansible and contractible bore for holding rod guides of various radial dimensions in proper position to feed a rod to the welding point or may consist of a head in the nature of a rod guide attached to the heating unit and constructed so as to be adjustable for varying the radial dimensions of its bore to accommodate rods of varying cross-section therein, and position the same for advantageous feeding to the welding point.

In the variable bore of either the clamping head of the first construction or the rod guide of the second construction, it is preferable that the section thereof be such as to position the members interchangeably placed therein in identical position with respect to the heating unit regardless of their cross-section and that the contact of the walls of said bores with the members be such as to hold them in a definite position against any lateral displacement. These results may be effectively accomplished by providing the bore with a flat side adjacent to and in fixed relation to the heating unit and with other walls lying at angles to the fixed wall and adjustable to and from the fixed wall for varying the cross-sectional area of the bore.

The above and other objects and novel features of the invention will become more apparent from the following specifications taken with the accompanying drawings, in which Fig. 1 is a side view of one form of apparatus made in accordance with the present invention, and showing a welding rod guide attached to a torch and adjustable to various cross-sectional dimensions of welding rods.

Fig. 2 is a plan view of the rod guide on an enlarged scale compared with Fig. 1; the rest of the apparatus being shown fragmentarily and the handle and rod being broken away on line 2—2, Fig. 1.

Fig. 3 is a sectional view taken vertically through the rod guide and torch on the line 3—3 Fig. 2 on a slightly smaller scale than Fig. 2.

Fig. 4 is a bottom plan view of the rod guide on the same scale as Fig. 2.

Fig. 5 is a view in cross-section on the line 5—5 Fig. 3.

Fig. 6 is a fragmentary view of the rod guide showing the push and pull relation of the adjusting screws both for expanding the rod guide and for effecting angular adjustment thereof relative to the torch.

Fig. 7 is a view showing a modified form of the invention in which the apparatus is adapted to the interchangeable support of a plurality of rod guides varying in their radial dimensions.

Fig. 8 is a view in section on line 8—8 Fig. 7 and on an enlarged scale.

Fig. 9 is a view in vertical section through the rod guide and its support on a scale intermediate between Figs. 7 and 8.

The apparatus as shown in Figs. 1 to 6 inclusive comprises a heating unit as a torch T connected by a carriage C to supports S which latter are adapted to rest upon the work W. Connected with the torch is a rod guide G which constitutes the subject of the present invention and serves to guide a welding rod R to the welding point P. A suitable handle H is connected with the torch for manipulation thereof about the fulcrum between the supports S and the work; said handle also serving for drawing the apparatus over the work.

The rod guide G may be comprised of a pair of members 10 and 11; one of which, as shown, may be hinged to the heating unit T by interengaging members 12 and 13; the other member designated by the numeral 11 being suitably connected to the member 10 for adjustment toward and away therefrom as may be required by the cross-section of a rod to be used therewith. Member 10 presents a flat surface 14 toward the member 11 and the member 11 is provided with a concavity 15 extending lengthwise thereof and directed toward the surface 14; this concavity being preferably formed between converging flat walls 16 and 17. It will be noted that by the construction of these two members a bore is provided longitudinally of the guide tube when the members are assembled, which is adapted to receive therein a welding rod for directing the same to the welding point.

The members are connected for adjustment toward and away from each other by screws 18 threaded through opposing pairs of ears 19, 20 and 21, 22 respectively on sections 10 and 11 and extending from opposite longitudinal edges thereof. The screws 18 are preferably arranged in pairs with other screws 23 in push and pull relation to each other for holding the members in proper adjustment to each other. In this relationship, screws 18 extend loosely through ears 19 and 20 and are threadedly engaged with ears 21 and 22 while the shanks of screws 23 are threaded through ears 21 and 22 with their ends abutting against ears 19 and 20. The rod guide may be provided interiorly of its bore with ribs or raised portions 24 and 25 spaced apart and transversely of the sides thereof; these ribs comprising contact members for holding a rod being guided thereby in proper position to the torch without binding within the bore.

The rod guide, as a whole, is capable of slight adjustment about the pivotal connection between members 12 and 13 to cvompensate for inaccuracies in the manufacture of these parts or for variations in the size of torch tips interchangeably used with the apparatus. Such adjustments may be conveniently effected by screws 26 in push and pull relation with other screws 27; the screws 26 extending through ears 28 on the torch, and ears 20 on the guide member 10; the ears 20 being extended below opposing ears 22 on member 11 for this purpose and the screws 27 extending through ears 28 with the ends of their shanks abutting against ears 20.

The edges of the members 10 and 11 are maintained in proper alignment during adjustment one to the other by guide fingers 29 and 30 arranged in pairs on opposite edges of the member 10 and respectively adjacent the upper and lower ends of the guide tube. These fingers embrace the ends of the member 11 holding it properly positioned to member 10 during such adjustment.

It will be apparent from the foregoing specifications that the guide tube as hereinbefore described is adjustable to provide a bore variable in cross-section so as to be adapted to accommodate similarly varying welding rods and to feed the same by gravity to the welding point. By provision of a flat surface adjacent the torch, identical positioning of the rod supported in the tube to the flame of the torch will be assured regardless of the shape or cross-sectional dimensions of the rod used, and by provision of the triangular cross-section of the bore the same will accommodate itself to all diameters of rod and all cross-sectional configurations thereof.

Another construction of apparatus accomplishing substantially the same ends as the apparatus described above, is illustrated in Figs. 7, 8 and 9. In this apparatus, a clamping head 35 is provided, hollowed out at 36 to receive a rod guide tube 37 therein. The tube being clamped in place by a cap 38 connected to the head by screws 39 extending through opposing ears 40 and 41 on both sides of the head and cap.

The shape of the bore of the split ring construction illustrated in these two figures is such as to accommodate itself to guide tubes of varying diameter and the surfaces for gripping the guide tube may present in cross-section, a polygonal configuration similar to that illustrated in the rod guide of the form shown in Figs. 1 to 6 inclusive, with a flat side adjacent to the torch and transversely of its line of travel when welding. Either apparatus, as illustrated, may be readily accommodated to a welding rod of any cross-section which it is desired to use therewith.

I claim:

1. In welding apparatus, the combination of a heating unit for providing welding heat at a welding point; a member connected with the heating unit having an expansible bore and means for holding said bore at varying degrees of expansion.

2. In welding apparatus, the combination of a heating unit for providing welding heat at a welding point; a member connected with said unit and having an expansible bore the sides of which are so constructed and arranged that they will interchangeably position any one of a plurality of members varying in cross-section in the same definite relation to said heating unit.

3. In welding apparatus, the combination of a heating unit for providing welding heat at a welding point; a split member connected to said unit; means carried by said member for directing a welding rod to said point; and means for expanding and contracting said member thereby adapting the apparatus to rods of various cross-sections.

4. In welding apparatus, the combination of a heating unit for providing welding heat at a welding point; and a split member having an expansible bore; means for expanding and contracting said bore and for holding it in various conditions of expansion; and means supported by said member for directing a welding rod to said welding point.

5. In welding apparatus, the combination of a heating unit for providing welding heat at a welding point; a rod guide secured to said unit and positioned to direct a welding rod to said point; said rod guide having an expansible and contractible bore for accommodation of rods of various cross-section.

6. In welding apparatus, the combination of a heating unit for providing welding heat at a welding point; a rod guide secured to said unit and positioned to direct a welding rod to said point; said rod guide having an expansible bore for accommodation of rods of various cross-section; and means for securing said guide in various degrees of expansion.

7. In welding apparatus, the combination of a heating unit for providing welding heat at a welding point; and a rod guide comprising a member connected with said heating unit; and a second member coextensive with and carried by, and adjustable to and from the first named member for accommodation of rods of varying cross-section.

8. In welding apparatus, the combination of a heating unit for providing welding heat at a welding point; and a rod guide comprising a member connected with said heating unit and provided with a flat surface; and a second member carried by the first named member and adjustable to and from said flat surface.

9. In welding apparatus, the combination of a heating unit for providing welding heat at a welding point; a rod guide for directing a welding rod to said point comprising a member secured to the heating unit and stationary relative thereto, and a second member adjustable to and from the first-named member.

10. In welding apparatus, the combination of a heating unit for providing welding heat at a welding point; a rod guide for directing a welding rod to said point; said rod guide comprising a member secured to the heating unit and stationary relative thereto; a second member coextensive with and adjustable to and from the first-named member; means for guiding the said second member in its adjustment relative to the first member.

11. In welding apparatus, the combination of a heating unit for providing welding heat at a welding point; a welding rod guide connected thereto for directing a welding rod to said point; said rod guide having an expansible and contractible bore for accommodation of rods of various cross-section; the wall of said bore being flat on the side adjacent the heating unit.

12. In welding apparatus, the combination of a heating unit for providing welding heat at a welding point; a welding rod guide connected thereto for directing a welding rod to said point; said rod guide having an expansible bore for accommodation of rods of various cross-section and being constructed and arranged so that point contacts are provided in said bore for positioning a rod in the bore; at least one of which is disposed on the side of the bore adjacent the heating unit and is fixed relative to the said heating unit.

13. In welding apparatus, the combination of a heating unit for providing welding heat at a welding point; a welding rod guide connected thereto for directing a welding rod to said point; said rod guide having an expansible and contractible bore for accommodation of rods of various cross-section; and contact members extending from the walls of the guide into the bore for positioning the rod therein; one of the contacts lying on the wall adjacent the heating unit and being fixed relative to said heating unit.

14. In welding apparatus, the combination of a heating unit for providing welding heat at a welding point; a welding rod guide connected thereto for directing a welding rod to said point; said rod guide comprising a pair of members one of which is secured to the heating unit and presents a flat surface toward the other member; the other member having converging walls providing a concave contour directed toward said flat surface; and adjustable means for varying the distance between said members for accommodation of rods of varying cross-section.

15. In welding apparatus, the combination of a heating unit for providing welding heat at a welding point; a welding rod guide connected thereto for directing a welding rod to said point; said guide comprising a pair of members together providing a bore; said members having opposing ears and means cooperating with the ears for adjustably connecting the members together.

16. In welding apparatus, the combination of a heating unit for providing welding heat at a welding point; a welding rod guide connected thereto for directing a welding rod to said point; said guide comprising a pair of members together providing a bore; said members having opposing ears and push and pull means for adjustably connecting the opposing ears.

17. In welding apparatus, the combination of a heating unit for providing welding heat at a welding point; a welding rod guide connected thereto for directing a welding rod to said point; said guide comprising a pair of members together providing a bore triangular-shaped in cross-section and with one side lying adjacent the heating unit in fixed relation thereto and extending transversely of the line of movement thereof along a weld; said members being adjustable relatively to each other.

18. In welding apparatus, the combination of a heating unit for providing welding heat at a welding point; a plurality of welding rod guides having bores differing as between them in cross-section and adapted to accommodate rods correspondingly differing in cross-section; and means for connecting said guides interchangeably to the heating unit; said means being adjustable to the cross-section of the various guides.

19. In welding apparatus, the combination of a heating unit for providing welding heat at a welding point; a plurality of rod guides usable interchangeably for directing rods of various cross-section to the welding point; said guides varying in cross-section correspondingly to the rods; means for securing said rod guides interchangeably to the heating unit; said means comprising members adjustably connected together for clamping a rod guide therebetween.

20. In welding apparatus, the combination of a heating unit for providing welding heat at a welding point; a plurality of rod guides usable interchangeably for directing rods of various cross-section to the point; said guides varying in cross-section correspondingly to the rods; and means for securing said rod guides interchangeably to the heating unit; said means comprising a member having a bore expansible and contractible to accommodate the cross-sectional dimensions of the particular rod guide inserted therein.

ROBERT J. KEHL.